United States Patent
Bruno et al.

(10) Patent No.: US 10,549,860 B2
(45) Date of Patent: Feb. 4, 2020

(54) ENVIRONMENTAL CONTROL SYSTEM UTILIZING CABIN AIR TO DRIVE A POWER TURBINE OF AN AIR CYCLE MACHINE

(71) Applicant: Hamilton Sundstrand Corporation, Windsor Locks, CT (US)

(72) Inventors: Louis J. Bruno, Ellington, CT (US); Donald E. Army, Jr., Enfield, CT (US); Thomas M. Zywiak, Suffield, CT (US); Harold W. Hipsky, Willington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 49 days.

(21) Appl. No.: 14/553,012

(22) Filed: Nov. 25, 2014

(65) Prior Publication Data

US 2016/0144965 A1 May 26, 2016

(51) Int. Cl.
*B64D 13/06* (2006.01)

(52) U.S. Cl.
CPC ...... *B64D 13/06* (2013.01); *B64D 2013/0618* (2013.01); *B64D 2013/0648* (2013.01)

(58) Field of Classification Search
CPC ........... B64D 13/06; B64D 2013/0688; B64D 13/08; B64D 2013/0644; Y02T 50/56; Y02T 50/44; F02C 6/08; F02C 9/18; F05D 2220/50
See application file for complete search history.

(56) References Cited

U.S. PATENT DOCUMENTS

| | | | |
|---|---|---|---|
| 4,021,215 A | 5/1977 | Rosenbush et al. | |
| 4,779,644 A * | 10/1988 | Benson | B64D 13/00 137/606 |
| 5,014,518 A * | 5/1991 | Thomson | B64D 13/06 60/684 |
| 5,086,622 A * | 2/1992 | Warner | B64D 13/06 62/172 |

(Continued)

FOREIGN PATENT DOCUMENTS

| CN | 101743166 A | 6/2010 |
|---|---|---|
| CN | 103562067 A | 2/2014 |

(Continued)

OTHER PUBLICATIONS

EPSR for EP Application No. 14182692.5, dated Feb. 5, 2015, 6 pages.

(Continued)

*Primary Examiner* — Elizabeth J Martin
*Assistant Examiner* — Melodee Jefferson
(74) *Attorney, Agent, or Firm* — Cantor Colburn LLP

(57) ABSTRACT

A system, which includes a plurality of heat exchangers and a compressing device, prepares a medium bled from a low-pressure location of an engine and flowing through a plurality of heat exchangers into a chamber. The compressing device is in communication with the plurality of heat exchangers and regulates a pressure of the medium flowing through the plurality of heat exchangers. The compressing device includes a turbine that provides supplemental power to the compressing device based on a pressure of the medium in the chamber.

1 Claim, 3 Drawing Sheets

(56) References Cited

U.S. PATENT DOCUMENTS

| | | | |
|---|---|---|---|
| 5,461,882 A * | 10/1995 | Zywiak | B60H 1/00007 62/401 |
| 5,701,755 A * | 12/1997 | Severson | B64D 13/00 62/402 |
| 5,704,218 A * | 1/1998 | Christians | B64D 13/06 62/172 |
| 5,967,461 A * | 10/1999 | Farrington | B64D 13/06 244/118.5 |
| 6,065,302 A * | 5/2000 | Sada | F24F 5/0003 165/104.24 |
| 6,148,622 A * | 11/2000 | Sanger | B64D 13/06 62/402 |
| 6,193,878 B1 | 2/2001 | Morse et al. | |
| 6,199,387 B1 | 3/2001 | Sauterleute | |
| 6,381,969 B1 * | 5/2002 | Afeiche | B64D 13/06 62/87 |
| 6,427,471 B1 * | 8/2002 | Ando | B64D 13/06 62/402 |
| 6,457,318 B1 * | 10/2002 | Lui | B64D 13/06 62/402 |
| 6,484,518 B1 * | 11/2002 | Laugt | B64D 13/06 62/87 |
| 6,883,335 B2 | 4/2005 | Axe et al. | |
| 7,017,365 B2 * | 3/2006 | Haas | B64D 13/06 62/401 |
| 7,171,819 B2 | 2/2007 | Lui | |
| 7,322,202 B2 | 1/2008 | Zywiak et al. | |
| 7,334,423 B2 * | 2/2008 | Bruno | B64D 13/06 62/402 |
| 7,607,318 B2 * | 10/2009 | Lui | B64D 13/06 244/118.5 |
| 7,797,962 B2 | 9/2010 | Kresser et al. | |
| 7,849,702 B2 | 12/2010 | Parikh | |
| 7,975,499 B2 * | 7/2011 | DeFrancesco | B64D 13/08 62/239 |
| 8,418,495 B2 * | 4/2013 | Merritt | B64D 13/06 415/216.1 |
| 9,146,004 B2 * | 9/2015 | Mayo | B60H 1/00535 |
| 9,169,023 B2 * | 10/2015 | Mayo | F16L 3/00 |
| 9,205,925 B2 | 12/2015 | Bruno et al. | |
| 9,487,300 B2 * | 11/2016 | Klimpel | B64D 13/08 |
| 2002/0152765 A1 * | 10/2002 | Sauterleute | B64D 13/00 62/401 |
| 2003/0051500 A1 | 3/2003 | Asfia et al. | |
| 2004/0194493 A1 * | 10/2004 | Army, Jr. | B64D 13/06 62/402 |
| 2004/0195447 A1 | 10/2004 | Claeys | |
| 2005/0011214 A1 * | 1/2005 | Ratliff | B60H 1/3223 62/324.1 |
| 2005/0115249 A1 * | 6/2005 | Haas | F28F 27/02 62/86 |
| 2006/0162371 A1 | 7/2006 | Lui et al. | |
| 2008/0264084 A1 | 10/2008 | Derouineau et al. | |
| 2011/0016863 A1 * | 1/2011 | Ernst | F01K 25/10 60/645 |
| 2013/0133348 A1 * | 5/2013 | Squier | B64D 13/08 62/172 |
| 2014/0166812 A1 * | 6/2014 | Ji | B64D 13/06 244/134 C |
| 2014/0326010 A1 * | 11/2014 | Kawakami | B60H 1/323 62/222 |
| 2015/0065025 A1 | 3/2015 | Bruno et al. | |
| 2015/0107261 A1 | 4/2015 | Moes et al. | |
| 2015/0251765 A1 | 9/2015 | Jonqueres et al. | |
| 2015/0307183 A1 | 10/2015 | Bruno et al. | |
| 2015/0307196 A1 | 10/2015 | Bruno | |
| 2016/0231031 A1 | 8/2016 | Bruno | |

FOREIGN PATENT DOCUMENTS

| | | | | |
|---|---|---|---|---|
| CN | 103946111 A | | 7/2014 | |
| EP | 1327582 A1 | | 7/2003 | |
| EP | 2937287 A1 | | 10/2015 | |
| EP | 3025962 A1 | | 6/2016 | |
| EP | 3095702 A1 | | 11/2016 | |
| EP | 3103721 A1 | | 12/2016 | |
| GB | 2355520 A | * | 4/2001 | B64D 13/06 |

OTHER PUBLICATIONS

EPSR for EP Application No. 15189018.3, dated Feb. 23, 2016, 7 pages.

EP Extended EP Search Report for EP Application No. 1716776.8 dated Jul. 27, 2017; 8 Pages.

First Office Action and Search Report (with English Translation); Chinese Application No. 201510646904.6; dated Sep. 5, 2018; 19 Pages.

* cited by examiner

ENVIRONMENTAL CONTROL SYSTEM UTILIZING CABIN AIR TO DRIVE A POWER TURBINE OF AN AIR CYCLE MACHINE

BACKGROUND OF THE INVENTION

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

BRIEF DESCRIPTION OF THE INVENTION

According to one embodiment, a system comprises at least one heat exchanger; a medium bled from a low-pressure location of an engine and flowing through the heat exchanger into a chamber; a compressing device in communication with the heat exchanger and configured to regulate a pressure of the medium flowing through the heat exchanger; and a turbine coupled to the compressing device and configured to provide supplemental power to the compressing device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

Figure 1:
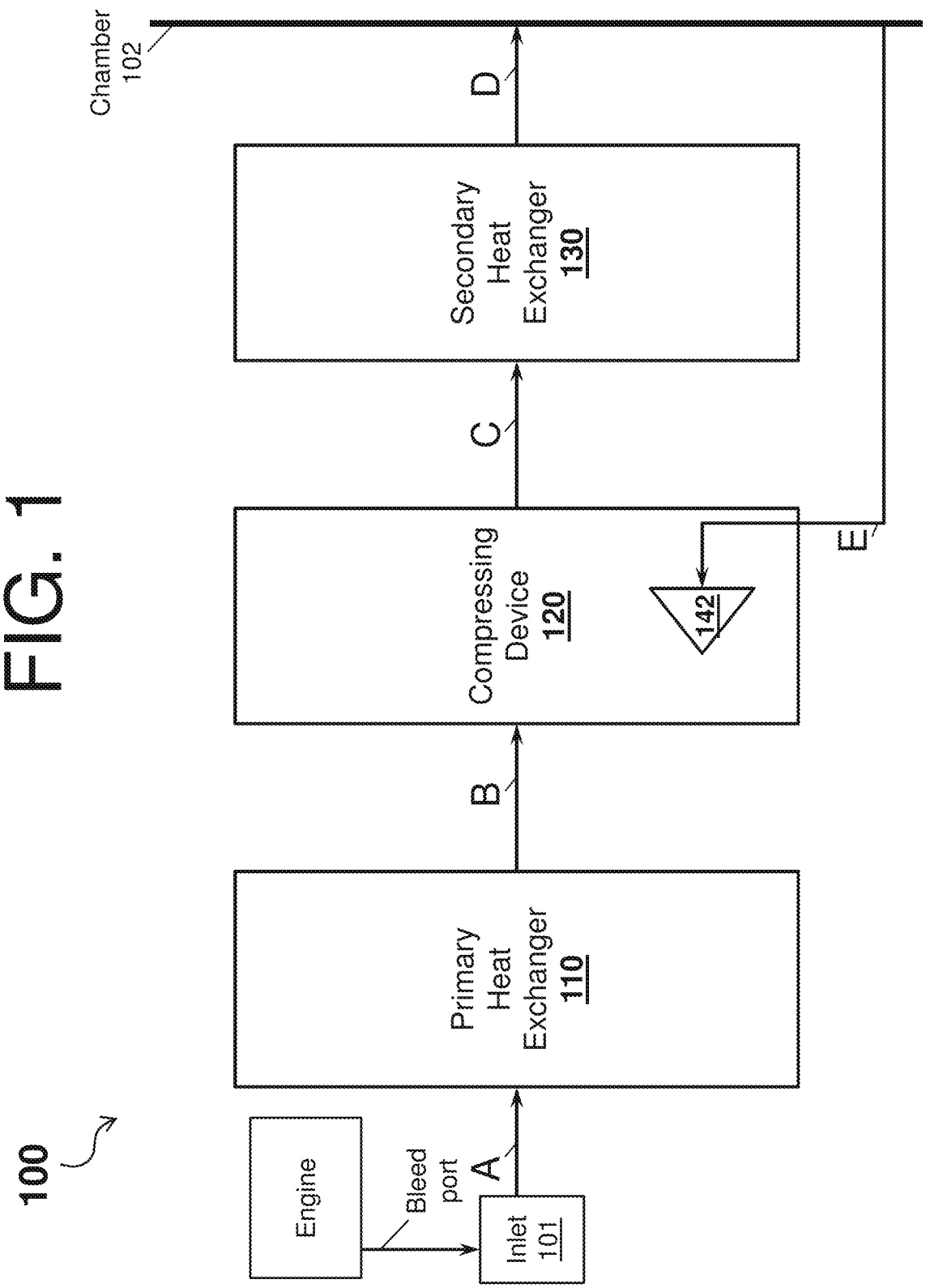
FIG. 1 is a diagram of an schematic of an environmental control system according to an embodiment.

A detailed description of one or more embodiments of the disclosed apparatus and method are presented herein by way of exemplification and not limitation with reference to the figures.

As indicated herein, the relatively high pressures provide limited efficiency with respect to engine fuel burn. Thus, what is needed is an environmental control system that leverages cabin air to increase a pressure of lower engine bleed air that is being bled at a pressure level slightly above cabin pressure to, thus, provide cabin pressurization and cooling at a high engine fuel burn efficiency.

In general, embodiments of the present invention disclosed herein may include a system comprising one or more heat exchangers; a medium flowing through the one or more heat exchangers, wherein the medium is bled from a low-pressure location of an engine through the one or more heat exchangers into a chamber. The low-pressure location of the engine provides the medium at an initial pressure level near a pressure of the medium once it is in the chamber (e.g., chamber pressure). The medium may be slightly above or slightly below the pressure in the chamber. Bleeding the medium at such a low pressure from the low-pressure location causes less of a fuel burn than bleeding air from a higher pressure location. Yet, because the medium is starting at this relatively low initial pressure level and because a drop in pressure occurs over the one or more heat exchangers, the medium will drop below the chamber pressure while the medium is flowing through the one or more heat exchangers. When the pressure of the medium is below the pressure of the chamber the medium will not flow into the chamber to provide pressurization and temperature conditioning.

Thus, a compressing device, in communication with the one or more heat exchangers, is utilized to regulate a pressure of the medium flowing through the one or more heat exchangers to ensure there is sufficient pressure to provide flow into the chamber. The compressing device utilizes the medium itself as a power source to regulate the pressure of the medium. Yet, the medium at the initial pressure level bleed from the engine alone does not supply enough power to the compressing device to ensure that the pressure of the medium is boosted above the chamber pressure to ensure the flow of the medium into the chamber. The compressing device further includes a power turbine that utilizes exhaust air from the chamber to provide additional power to the compressing device. In this way, the compressing device with the turbine regulates/increases the pressure of the medium as it flows through the one or more heat exchangers to, thus, allow for connecting to the low-pressure location source of bleed air.

For example, in view of an aircraft embodiment, air cycle machine (e.g., the compressing device) of cabin air conditioning system (e.g., environmental control system) utilizes as a source of energy a pressure of air bleed (e.g., bleed air) from an engine of an aircraft. The turbine is added to the air cycle machine of an aircraft and utilizes as a source of energy a pressure of air in a cargo compartment, cabin, or flight deck (e.g., cabin pressure in general) to provide supplemental power to the air cycle machine. The combined sources of energy are utilized to prepare the bleed air by the air cycle machine so that the cabin air conditioning system can utilize bleed air from the engine of the aircraft at the initial pressure level described above, i.e., a pressure level slightly above or below the cabin pressure. Examples of values of the initial pressure level include pressure levels greater than 5 psia above the cabin pressure, at 5 psia, or between the cabin pressure and 5 psia (e.g., cabin pressure is generally at 12 psia).

FIG. 1 illustrates a system 100 with a medium (e.g., air) flowing from an inlet 101 to a chamber 102. In the system 100, the medium flows from the inlet 101 to a primary heat exchanger 110 (e.g., arrow A), from the primary heat exchanger 110 to a compressing device 120 (e.g., arrow B), from the compressing device 120 to a secondary heat exchanger 130 (e.g., arrow C), and from the secondary heat exchanger 130 to the chamber 102.

In one embodiment, the system 100 is any environmental control system of a vehicle, such as an aircraft or watercraft, that provides air supply, thermal control, and cabin pressurization for a crew and passengers of the vehicle (e.g., a cabin air conditioning system of an aircraft). The system may also include avionics cooling, smoke detection, and fire suppression. For example, on an aircraft, air is supplied to the environmental control system by being "bled" from a compressor stage of a gas turbine engine. The temperature and pressure of this "bleed air" varies widely depending upon which compressor stage and a revolutions per minute of the gas turbine engine. To achieve the desired temperature, the bleed-air is cooled as it is passed through at least one heat exchanger (e.g., exchangers 110, 130). To achieve the desired pressure, the bleed-air is compressed as it is passed through a compressing device (e.g., compressing device 120).

With respect to the vehicle being an aircraft, the system 100 is an environmental control system that supplies pressurized air (e.g., a medium) to any environment, such as a cabin (e.g., chamber 102) and flight deck of an aircraft, for both comfort and pressurization. The pressurized air supplied by the ECS may originate from a compressor stage of an engine (e.g., via a bleed air system) and/or directly from exterior air (e.g., via a ram air system). The interaction of the ECS with the engine in a bleed air system influences how much fuel burn by the engine is needed to perform operations, such as supplying pressurized air, related to that interaction. For example, in a bleed air system of an aircraft, air is extracted from a pre-defined stage location of an engine compressor region of an engine core of the aircraft (e.g., the compressor stage).

Heat exchangers (e.g., a primary heat exchanger 110 and a secondary heat exchanger 130) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example herein, air forced by a fan (e.g., via push or pull methods) is blown across the heat exchanger at a variable cooling airflow to control the final air temperature of the bleed-air.

The compressing device 120 (e.g., an air cycle machine as described below) is a mechanical device that regulates a pressure of a medium (e.g., increasing the pressure of a gas) via a compressor. Examples of the compressor of the compressing device 120 include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

In operation, the primary heat exchanger 110 of the system 100 receives (e.g., arrow A) a medium at a first pressure and first temperature. The primary heat exchanger 110 then cools the medium, which lowers the first pressure to a second pressure.

Next, the medium is communicated (e.g., arrow B) to the compressing device 120 that regulates a pressure of the medium flowing within the system 100 by raising the second pressure of the medium to a third pressure, which has a higher value than the second pressure. Therefore, in the system 100, the compressing device 120 boosts the pressure of the medium as it exits the primary heat exchanger 110 (e.g., arrow B), so that the secondary heat exchanger 130 may receive the medium at its input at a higher pressure (e.g., arrow C). As shown in FIG. 1, the compressing device 120 includes a turbine 142 that utilizes exhaust from the chamber 102 (e.g., arrow E) to provide additional power to the compressing device 120.

It should be understood that a single heat exchanger embodiment could be implemented consistent with the present invention, where the compressing device 120 boosts the pressure of the medium prior to, or after, the medium flows through the single heat exchanger.

Returning to FIG. 1, the medium is then communicated (e.g., arrow C) to the secondary heat exchanger 130 that cools the medium again, before the medium exits (e.g., arrow D) to the chamber 102.

With respect to an aircraft example, FIG. 1 is discussed below. In general, bleeding air from a low-pressure location causes less of a fuel burn than bleeding air from a high pressure location. Yet, because a drop in pressure occurs over the system 100, when air is bled from a low-pressure location, the bleed-air flowing from the inlet 101 to the chamber 102 will observe an internal pressure drop below a final pressure (the pressure required to flow into the chamber). If the air pressure in the system 100 drops below a pressure that is desired at the chamber 102 (e.g., the final pressure), then the system 100 will cease to supply the bleed air to the chamber 102, and in turn the cabin of the aircraft. This is why the compressing device 120 is employed by the system 100, so as to ensure that the bleed air is boosted above the final pressure before being passed onto the secondary heat exchanger 130 and onto the chamber 102.

Further, the system 100 may be designed to gain even higher fuel burn efficiencies by extracting bleed air from a low-pressure location of the engine where the pressure is at a level slightly above the pressure desired at the chamber 102 (e.g., the final pressure). As indicated herein, because the power source for the system 100 is the bleed air itself, the bleed air at this low-pressure location of the engine may not supply enough power to the compressing device 120 to boost the bleed air above the final pressure before being passed onto the secondary heat exchanger. Thus, the turbine 142 is added to the compressing device 120 and air from the chamber 102 is utilized to drive the turbine 142, such that supplement power is provided to the compressing device 120. That is to say that turbine 142 increases the power available to compressing device 120, by extracting power from the pressure gradient between the air inside chamber 102 and the ambient air pressure outside of chamber 102.

In this way, air from the chamber 102 in addition to the bleed air is used to drive the compressing device 120, so that the highest fuel efficiency may be gained due to the bleed air being bled from the lowest possible pressure location of the engine (e.g., at a level slightly above typical cabin pressure e.g., such as 1 psig or more). It may be possible, in some system configurations, to bleed air from the engine that is below the required pressure to pressurize the cabin (e.g. −1 psig), and using energy extracted from the bleed air itself and energy extracted from the cabin pressure gradient to external ambient, boost the pressure in the bleed air using the compressing device 120 to provide conditioned pressurized air to the cabin.

Figure 2:
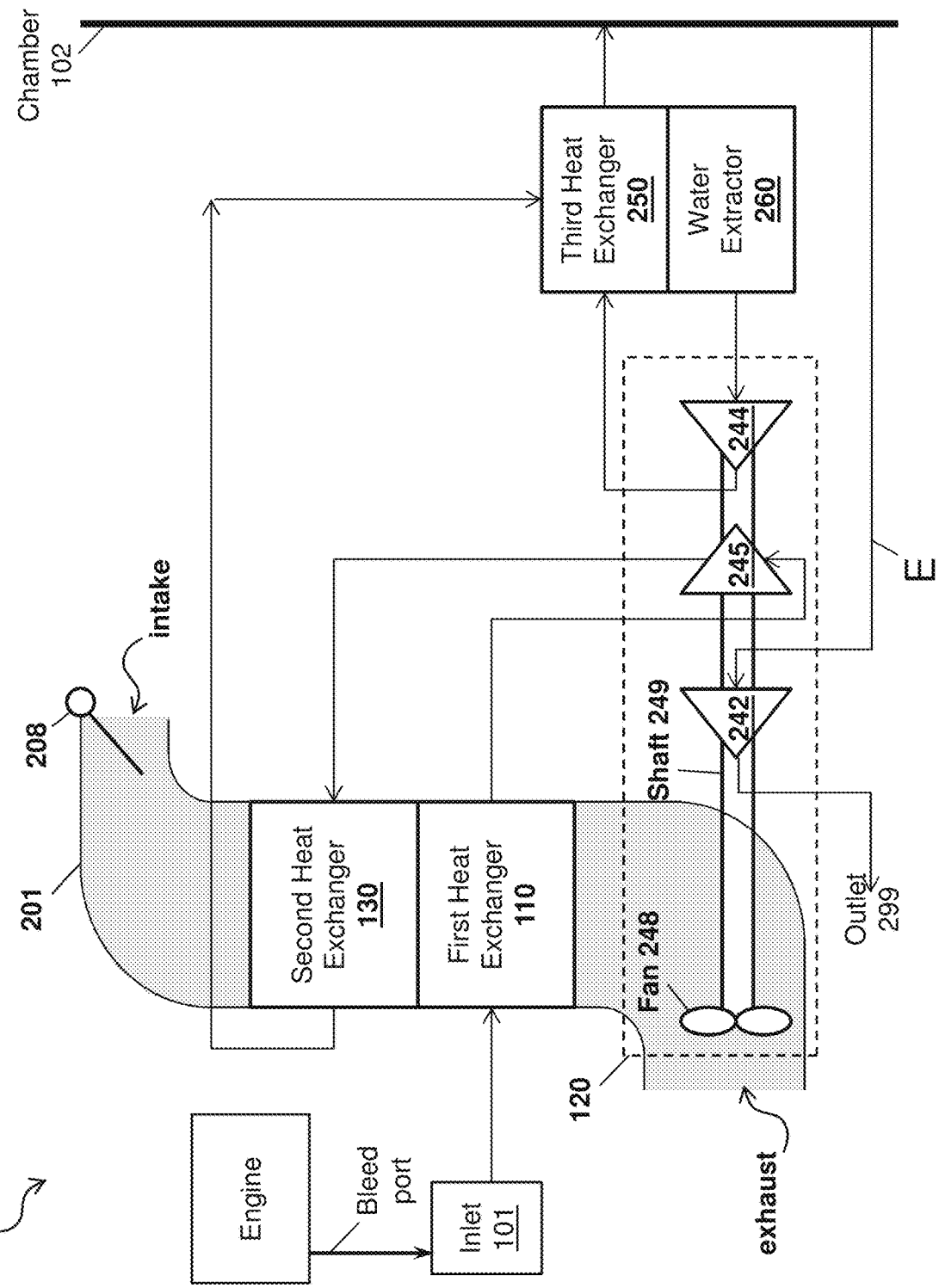
FIGS. 2-3 are operation examples of an environmental control system according to an embodiment.
Figure 3:
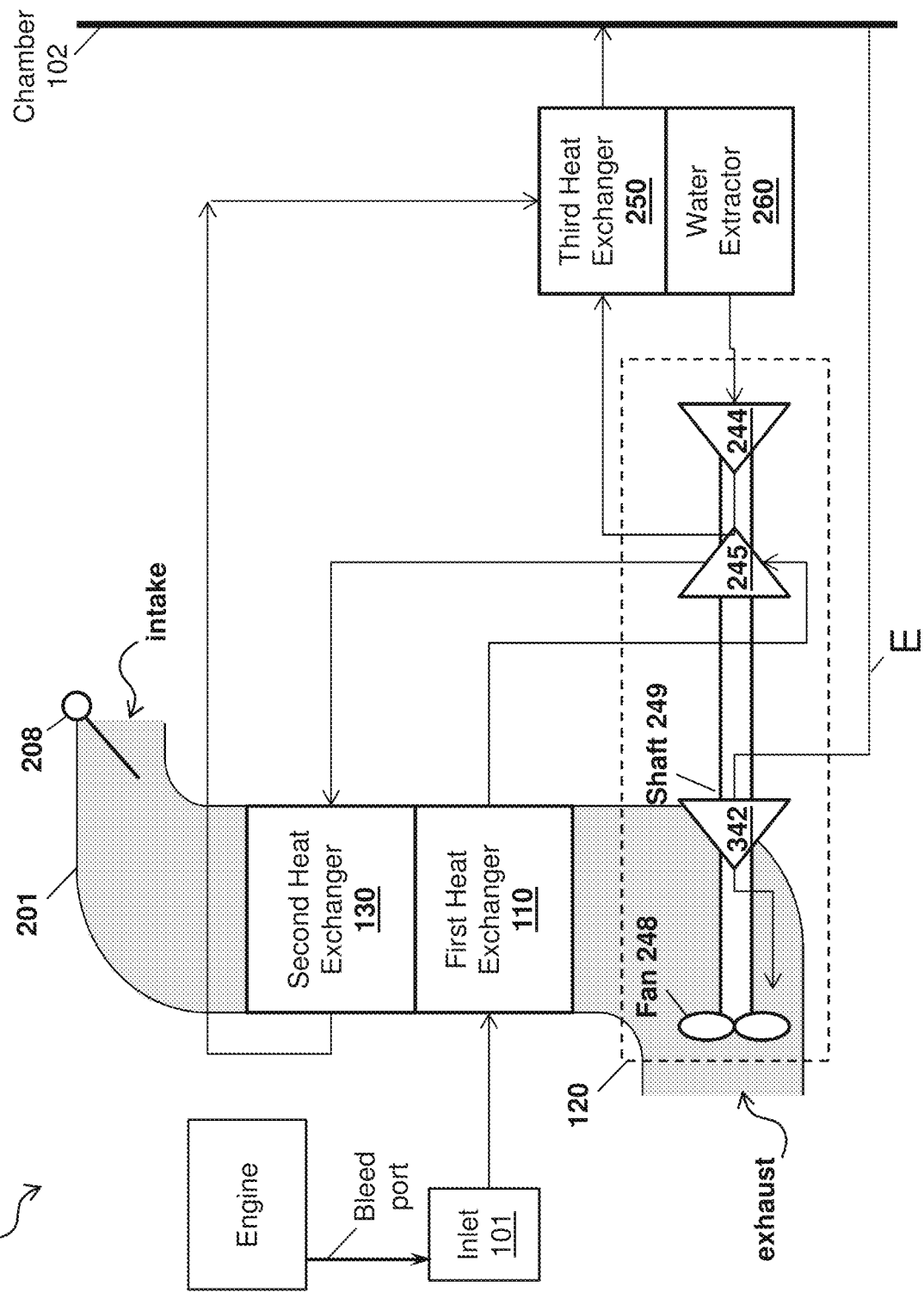

The system 100 of FIG. 1 will now be described with reference to FIGS. 2-3, in view of the aircraft example herein. FIG. 2 illustrates an environmental control system 200 (e.g., an embodiment of system 100) that includes, in addition to the previously described items of FIG. 1, a shell 201, a valve 208, the compressing device 120 (that includes a power turbine 242, a turbine 244, a compressor 245, a fan 248, and a shaft 249), a third heat exchanger 250, and a water extractor 260, each of which are connected via tubes, pipes, ducts and the like, such that bleed air is accepted at inlet 101 from a low-pressure location of an engine of an aircraft at an initial flow rate, pressure, and temperature and provided to chamber 102 (e.g., cabin, flight deck, etc.) at a final flow rate, pressure, and temperature. In this way, the credentials of the bleed air at the chamber 102 (e.g., the final flow rate, pressure, and temperature) enable the aircraft to receive pressurized and cooled air from the environmental control system 200.

The environmental control system 200 is an example of an environmental control system of an aircraft that provides air supply, thermal control, and cabin pressurization for the crew and passengers of the aircraft. The shell 201 is an example of a ram chamber of a ram system which uses dynamic air pressure created by an aircraft in motion to increase a static air pressure inside of the shell.

Valves, such as valve 208, are devices that regulate, direct, and/or control a flow of a medium (e.g., gases, liquids, fluidized solids, or slurries, such as bleed-air) by opening, closing, or partially obstructing various passageways within the tubes, pipes, etc. of the environmental control system 200. Valves may be operated by actuators such that the flow rates of any medium in any portion of the environmental control system 200 may be regulated to a desired value. For example, the valve 208 enables the intake of ambient air external to the aircraft into the shell 201, such that the ambient air may pass through the first and second heat exchangers and cool the bleed-air before exiting as an exhaust (e.g., the method of intake may be a pull method by a fan 248 driven by the shaft 249 of the compressing device 120 or a ram method as described herein).

The compressing device 120 can be an air cycle machine that regulates a pressure of a medium (e.g., increasing the pressure of a gas). The turbine 244 is a mechanical device that drives the compressor 245 and fan 248 via the shaft 249. The compressor 245 is a mechanical device that regulates a pressure of the bleed-air received from the first heat exchanger. The fan 248 is a mechanical device that forces via push or pull methods air through the shell 201 across the heat exchangers at a variable cooling airflow. The turbine 244, the compressor 245, and fan 248 together regulate pressure and illustrate, for example, that the air cycle machine (e.g., the compressing device 120) may operate as a three-wheel air cycle machine. In turn, the three-wheel air cycle machine includes the addition of the power turbine 242 that utilizes exhaust from the chamber 102 (e.g., arrow E) to provide additional power to the compressing device 120. Note that the addition of the turbine does not change the three-wheel air cycle machine into a four-wheel condensing cycle, because the two turbines 242, 244 are in series and the four-wheel condensing cycle does not use the exhaust from the chamber 102 as a source of energy to drive the cycle. The exhaust from the chamber 102 is then forwarded to outlet 299 (e.g., releases to ambient air).

The heat exchanger 250 is an example of a heat exchanger as described herein. The water extractor 260 is a mechanical device that performs a process of taking water from any source, such as bleed-air, either temporarily or permanently.

Further, it is noted that the location of the turbines 142, 242 may vary. FIG. 3 illustrates an environmental control system 300 (e.g., another embodiment of system 100) that includes, in addition to the previously described items of FIGS. 1 and 2, a power turbine 342 optimally placed with respect to a wall of the shell 201. In this regard, for example, the optimum power turbine placement on three- and four-wheel air cycle machines provides reduced fan power absorption at altitude by increasing flow of the fan 248 and by adding pre-swirl to a fan rotor inlet, thereby also providing an enhanced pressure boost (e.g., at the compressing device 120). Further, for example, the optimum power turbine placement on three- and four-wheel air cycle machines provides removal of power turbine exhaust ducting and discharge requirements; eliminating potential power turbine exhaust icing issues, ensuring a minimal air cycle machine length in a compact package, providing power turbine rotor cooling due to the low fan static pressure when power turbine is turned off during ground operation (draws cooling flow from the cabin), et cetera.

Additional embodiments of the turbines 142, 242, 342 may include an air cycle machine with an axial power turbine arrangement added to a three-wheel cycle (e.g., turbine, compressor, power turbine, and fan arrangement), a four wheel cycle (e.g., second turbine, first turbine, compressor, power turbine, and fan arrangement), et cetera, where an axial power turbine utilizes and discharges to an ambient pressure an exhaust of the chamber 102. Embodiments herein include the benefits of the axial power turbine having a minimal impact to a length of the air cycle machine (e.g., enabling a compact package). Embodiments herein include the benefits of the axial power turbine discharging to a ram fan inlet (e.g., to increase fan flow and fan inlet pre-swirl from turbine, reduce fan power absorption at altitude, reduce bleed pressure requirements, eliminate turbine exhaust ducting, and avoid turbine exit icing with hot fan air).

Additional embodiments of the turbines 142, 242, 342 may include an air cycle machine with a radial power turbine arrangement added to a three-wheel cycle (e.g., turbine, compressor, power turbine, and fan arrangement), a four wheel cycle (e.g., second turbine, first turbine, compressor, power turbine, and fan arrangement), et cetera, where a radial power turbine utilizes and discharges to an ambient pressure an exhaust of the chamber 102. Embodiments herein include the benefits of a tip turbine fan and reducing a length of the air cycle machine (e.g., enabling a compact package).

Additional embodiments of the turbines 142, 242, 342 may include an air cycle machine with a power tip turbine fan arrangement added to a three-wheel cycle (e.g., turbine, compressor, and power turbine/fan arrangement), a four wheel cycle (e.g., second turbine, first turbine, compressor, and power turbine/fan arrangement), et cetera, where a power tip turbine fan utilizes and discharges to ambient pressure an exhaust of the chamber 102. Embodiments herein include the benefits of a radial power turbine having minimal cost (e.g., enabling a inexpensive package), the radial power turbine discharging to a ram fan inlet, and power turbine rotor cooling during ground operation.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An aircraft comprising:
    an engine comprising a low-pressure bleed port;
    a ram air system comprising a shell, the ram system utilizing dynamic air pressure created by motion of the aircraft to increase a static air pressure inside of the shell; and
    an environmental control system fluidly coupled to the low-pressure bleed port of the engine,
    the environmental control system comprising:
        at least one heat exchanger comprising a first heat exchanger and a second heat exchanger, the first heat exchanger being fluidly coupled to the low-pressure bleed port of the engine; and
        a compressing device in fluid communication with the first heat exchanger and the second heat exchanger, the compressing device comprising a shaft supporting a first turbine, a second turbine, a fan, and a compressor,
    wherein the first heat exchanger, the compressor, the second heat exchanger, a first path of a third heat exchanger are fluidly coupled in series,
    wherein a water extractor, the first turbine, and a second path of the third heat exchanger are fluidly coupled in series,
    wherein the first path and the second path are fluidly coupled at the third heat exchanger between the low-pressure bleed port of the engine and a cabin of the aircraft,
    wherein the compressing device is configured to receive, through the first heat exchanger, bleed air being bled from the low-pressure bleed port of the engine, pressurize the bleed air from a first pressure to a second pressure via the compressor, and provide the bleed air to the second heat exchanger,
    wherein the second pressure is higher than the first pressure,
    wherein the first turbine and the second turbine drive the compressor of the compressing device by:
        the first turbine providing a primary power to the compressing device by expanding the bleed air after the bleed air has been exhausted from the first heat exchanger, and
        the second turbine providing a supplemental power to the compressing device by expanding cabin discharge air received from the aircraft cabin, and
    wherein the second turbine is located on a wall of the shell, the fan is located inside the shell, and the second turbine exhausts the cabin discharge air directly into the ram air system of the aircraft to provide a reduced fan power absorption at altitude by increasing flow of the fan.

* * * * *